March 21, 1933. G. PIRINOLI 1,902,374
REDUCING GEAR
Filed Sept. 23, 1931
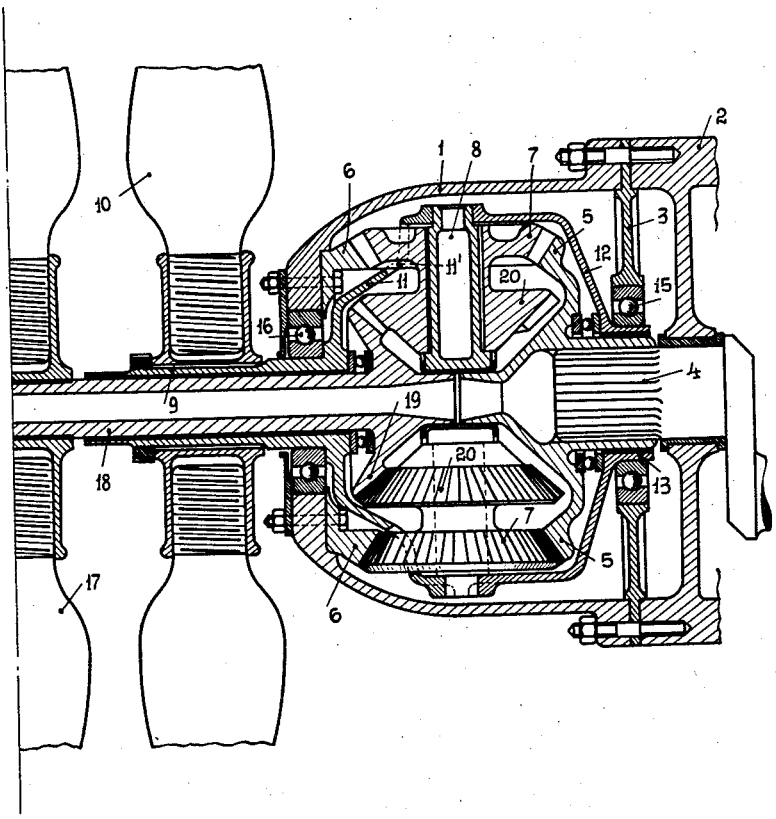
Inventor,
Guglielmo Pirinoli
Atty's Sommers & Young Patented Mar. 21, 1933                                                    1,902,374

UNITED STATES PATENT OFFICE

GUGLIELMO PIRINOLI, OF TURIN, ITALY, ASSIGNOR TO FIAT SOCIETÁ ANONIMA, OF TURIN, ITALY

REDUCING GEAR

Application filed September 23, 1931, Serial No. 564,650, and in Italy May 15, 1931.

This invention relates to a reducing gear of the sun and planet type for co-axial shafts rotating in opposite directions specially suitable for aircraft screw propellers arranged on the same side with respect to the engine. This reducing gear consists essentially in the combination of two reducing gears of the well-known sun and planet type, the planet wheels of the two gears being positively connected together and having therefore common pivots. The mechanism parts are thus considerably reduced in number, size and weight with respect to two separate reducing gears, the construction being at the same time simpler and stronger.

The accompanying drawing shows by way of example a reducing gear for two co-axial aircraft propellers according to this invention.

The figure shows the reducing gear in axial section.

The reducing gear is enclosed in an ogival box 1, attached by means of a flange to the engine casing 2 with the interposition of a diaphragm 3. The end of the engine shaft 4 passes through a suitable circular hole of the diaphragm 3 and carries the bevelled sun wheel 5 keyed thereto. The opposite rim 6 provided with a corresponding set of teeth is fixed to the casing 1 and constitutes a second sun wheel and the pinions 7 acting as planet wheels mesh with said wheels 5 and 6. The pivot 8 of the pinions 7 is fixed to the tubular shaft 9 on which the hub of the propeller 10 is keyed. Said shaft 9 is a part of a divided box 11, 12, provided with openings 11' for the pinions 7 and supporting the pivot 8 of said pinions.

For the purpose of supporting the box 11—12 its sleeve 13 is fitted on the hub of the toothed wheel 5 with the interposition of a bearing and is supported with the shaft 4 by the ball bearing 15 arranged in the diaphragm 3. Another ball bearing 16 at the opposite end of the box 1 supports the tubular shaft 9.

The above described mechanism constitutes a reducing gear of the sun and planet type between the engine shaft 4 and the driven shaft 9, said two shafts being co-axial to each other and rotating in the same direction. The driving toothed wheel 5 causes the pinions 7 to ride on the fixed rim 6; the pinions 7 carry along their pivot 8 and therefore the box 11—12 and the tubular shaft 9 integral with the box. The shaft 9 performs a number of turns which is one-half the number of turns of the shaft 4 in the same direction as the latter and carries along the propeller 10. According to this invention I incorporate with this propeller reducing gear for the propeller 10 a second reducing gear for the propeller 17 rotating in an opposite direction. The propeller 17 is keyed on the shaft 18 supported within the tubular shaft 9 by cylindrical bearings and the shaft 9 is supported by a ball bearing 16. The shaft 18 carries inside the box 11—12 the bevel wheel 19 meshing with the pinions 20 integral with the pinions 7 and rotating on the same pivots 8 carried by the box 11—12. It will be obvious that the toothed wheel 19 i. e. the shaft 18 with the propeller 17, as well as the shaft 9 and its propeller 10 are capable, by the provision of the mechanism according to this invention, to rotate in different directions and at different speeds according to the position, diameter and number of teeth of the respective driving bevel wheels.

Spur gears instead of bevel wheels can be employed in the mechanism according to this invention and other members can be modified without departing from the spirit of my invention.

What I claim is:

In a reducing gear, the combination with a casing, a driving shaft and two driven shafts concentrically arranged to each other and in alignment with the driving shaft, of a sun gear fixed to the casing, a sun gear keyed to said driving shaft, planet gears comprising two toothed rims, one of which meshes simultaneously with both of said sun gears, a casing for said planet gears connected with the outer driven shaft and supported on both sides by the first-mentioned casing, said casing being provided with openings, through which project the toothed rims meshing with the fixed sun gears and a third sun gear keyed on the inner driven shaft and meshing with the other toothed rim of said planet gears.

In testimony whereof, I hereunto affix my signature.

GUGLIELMO PIRINOLI.